June 10, 1958 A. A. FAYERS ET AL 2,837,829
COMPASSES, MAGNETOMETERS AND THE LIKE
Filed April 8, 1954 2 Sheets-Sheet 1

TO CATHODE RAY TUBE

Inventor
By *D. E. Fayer*
Attorney

2,837,829

COMPASSES, MAGNETOMETERS AND THE LIKE

Alfred A. Fayers, Milford, Fleet, and Alfred Hine, Slough, England, assignors to the Minister of Supply in Her Majesty's Government of the United Kingdom of Great Britain and Northern Ireland, London, England Application April 8, 1954, Serial No. 421,847

Claims priority, application Great Britain April 9, 1953

9 Claims. (Cl. 33—222)

The present invention relates to compasses, magnetometers and the like.

According to the present invention, a compass comprises a compass needle and an inductor or like magnetically-sensitive element disposed near the compass needle so that an electrical property of the inductor or like magnetically-sensitive element changes appreciably when the orientation of the compass needle with respect to the inductor or like magnetically-sensitive element changes.

An inductor or like magnetically-sensitive element is defined for the purpose of this specification and the appended claims as being any device an electrical property of which changes appreciably with the strength of a magnetic field applied to it in a predetermined direction; or with the orientation of a constant magnetic field applied to it, and the action of which on the orientation of the compass needle is, or is made to be, substantially negligible. For example, the inductor or like magnetically-sensitive element may be the well-known fluxgate saturable inductor.

In a preferred form of the present invention, the inductor or magnetically-sensitive element comprises one or more coils each wound upon a ferromagnetic core as described in co-pending British patent application No. 1712/52. In this case, the electrical property of the inductor or magnetically-sensitive element which changes, when the orientation of the compass needle with respect to the coil changes, is the self-inductance of the coil.

Figure 1:
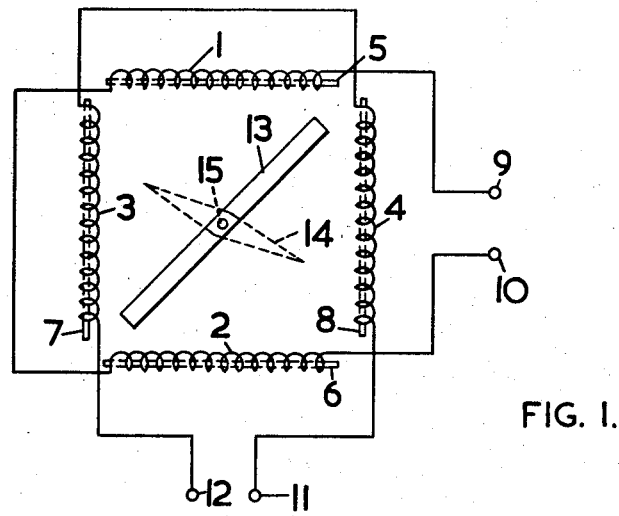
Figure 2:
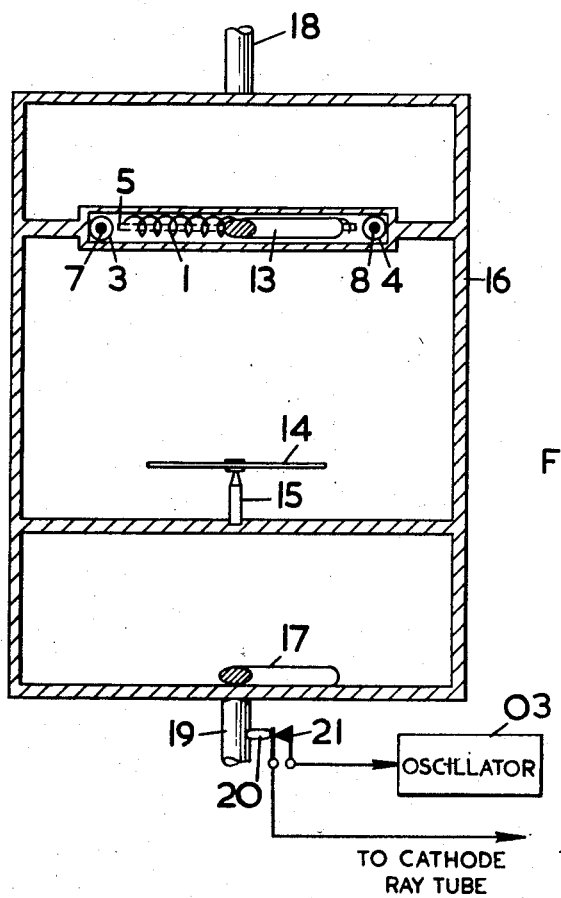
Figure 3:
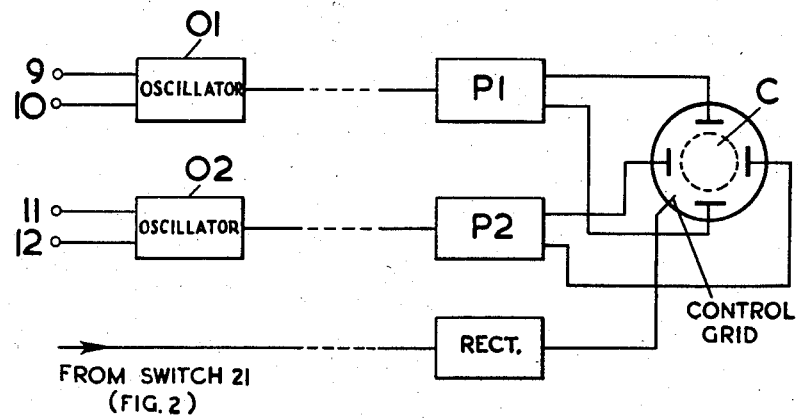
Figure 4:
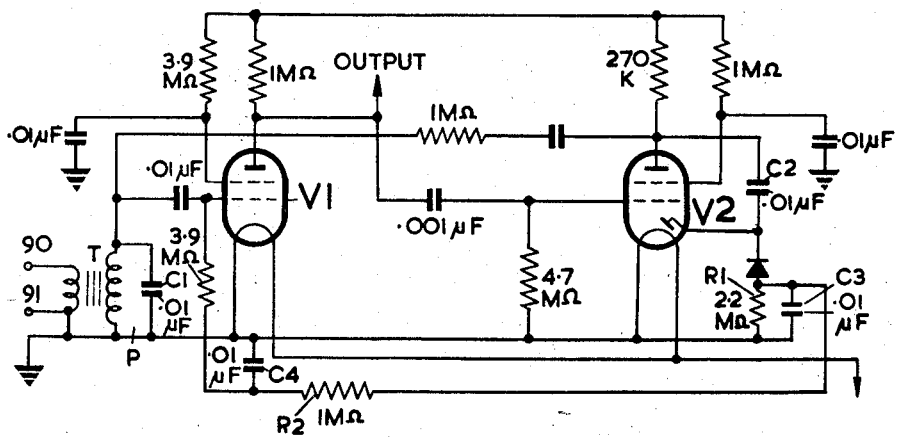

An embodiment of the present invention will now be described, by way of example, with reference to the accompanying drawings, in which:

Figure 1 is a diagrammatic representation of a section of part of a remote-reading compass, Figure 2 is a diagrammatic elevation view of a section of the part of the remote-reading compass shown in Figure 1, Figure 3 is a block schematic diagram of a system suitable for use with the arrangement shown in Figures 1 and 2, and Figure 4 is a circuit diagram of an oscillator used in the system shown in Figure 3.

Figure 1 shows four coils 1, 2, 3 and 4 arranged one along each side of a square. The coils have mu-metal cores 5, 6, 7 and 8. The arrangement of each coil and its respective core is similar to that described in co-pending British patent application No. 1712/52. The coils 1 and 2 are connected in a series between two terminals 9 and 10 and the coils 3 and 4 are similarly connected in a series between two terminals 11 and 12. Arranged along a diagonal of the aforementioned square is a bar magnet 13 which applies a biassing magnetic field to the mu-metal cores 5, 6, 7 and 8. The coils and the bar magnet all lie in the same plane.

Lying out of the plane containing the coils is a compass needle 14 which is pivoted about a pivot 15. The pivot 15 lies on a line perpendicular to the plane containing the coils and passing through the mid-point of the square along the sides of which the coils are arranged.

Figure 2 shows in less detail the coils 1, 3 and 4, the cores 5, 7 and 8 and part of the bar magnet 13. This magnet subtends an angle of 45 degrees to the longitudinal axes of the mu-metal cores 5, 6, 7 and 8 and so applies a biassing field of equal strength to each of these cores. The strength of the biassing field so produced is chosen so that, within the range of magnetic field strength applied to the cores 5, 6, 7 and 8, the incremental permeability of each core decreases substantially linearly with increasing magnetic field strength applied along the longitudinal axis of the core. The components are supported in a non-magnetic cylinder 16. Supported in the cylinder 16 is the compass needle 14 upon its pivot 15. Also shown is a part of a second bar magnet 17, the axis of which is parallel to the axis of the magnet 13, and of such a strength that the resultant field due to magnets 13 and 17 is zero at the compass needle. The cylinder 16 is rotable upon spindles 18 and 19.

Figure 3 shows in the form of a block diagram, two oscillators O1 and O2. The terminals 9 and 10 of the oscillator O1 are connected across part of the tuned circuit of the oscillator. These terminals are connected to the terminals 9 and 10 shown in Figure 1 so that a change in the self-inductance of the coils 1 and 2 will result in a linear change in the frequency of the oscillator O1. Similarly the terminals 11 and 12 of the oscillator O2 are connected across part of the tuned circuit of the oscillator. These terminals are connected to the terminals 11 and 12 shown in Figure 1, the arrangement being such that a change in the self-inductance of the coils 3 and 4 will result in a linear change in the frequency of the oscillator O2. The construction of each of the oscillators O1 and O2 may conveniently be that hereinafter described with reference to Figure 4.

The outputs of the oscillators O1 and O2 are transmitted via a link (illustrated by the part-dotted lines in the figure) to discriminator circuits P1 and P2, at a remote station, whose outputs are connected to the X and Y plates of a cathode-ray tube C as shown at the right-hand side of Figure 3. The link may, for example, be a radio link such as that described with reference to Figures 2 and 3 of co-pending British patent application 1712/52.

Figure 4 shows an oscillator suitable for use both as the oscillator O1 and as the oscillator O2 and comprising retroactively coupled thermionic valves V1, V2. The frequency of the oscillator is controlled by a tuned circuit in the grid circuit of the valve V1. Part of the tuned circuit comprises the condenser C1 and a transformer T. One winding of this transformer has terminals 90 and 91 which correspond to the terminals 9 and 10 or the terminals 11 and 12 (shown in Figure 3) of the oscillator O1 or the oscillator O2 respectively. The oscillator shown in Figure 4 also comprises an automatic amplitude control which is connected to the anode of the valve V2 through a condenser C2. The amplitude control is composed of a diode portion to the valve V2, a rectifier D1, a load circuit R1, C3 and a smoothing circuit R2, C4. This arrangement enables the oscillatory current in the coils 1 and 2 or 3 and 4, as the case may be, to be kept small.

The operation of the embodiment shown in the drawings will now be described. The cylinder 16 is arranged to have its longitudinal axis substantially vertical. The compass needle 14 produces a magnetic field in a direction along the longitudinal axes of two or more of the mu-metal cores 5, 6, 7 and 8 according to the orientation of the cylinder 16 with respect to the magnetic axis of the compass needle. The resultant field, comprising the resultant of the biasing field and the field due to the compass needle, determines the permeability and the incremental permeability of each mu-metal core. The resultant field, and therefore the incremental permeability of each mu-metal core, will vary according to the orientation of the core with respect to the compass needle. The compass needle will rest with its magnetic axis in the direction of the horizontal component of the earth's magnetic field, since it is freely pivoted at 15. The permeability and the incremental permeability of the mu-metal cores and consequently the inductance of the coils 1, 2, 3 and 4 will, therefore, vary according to their orientation with respect to the direction of the horizontal component of the earth's magnetic field.

It will be remembered that the cores of the pairs of coils which are series-connected electrically are parallel to one another in space. It follows that the combined self-inductance of a pair of coils connected in series will depend on the orientation of the cores with respect to the controlling field from the compass needle 14. Thus, if $\theta$ degrees is the angle between the longitudinal axes of the coils 1 and 2 and the horizontal component of the earth's magnetic field, the combined self-inductance of these coils will be a function of $\cos \theta$ and the combined self-inductance of the coils 3 and 4 will be a function of $\sin \theta$.

If the cylinder 16 is rotated about its vertical axis upon spindles 18 and 19, the frequencies of oscillation of the oscillators O1 and O2 will vary sinusoidally. The frequencies of the oscillators O1 and O2 are arranged to vary about two different mean frequencies.

At the remote station, the frequency-modulated signals from the oscillators are demodulated by the discriminators P1 and P2 or by other frequency-conscious devices to provide two signals whose amplitudes vary as a function of $\cos \theta$ and $\sin \theta$ respectively, where $\theta$ defines the orientation of the cylinder 16 with respect to magnetic north. The signals are applied one to each pair of the deflecting plates of a cathode-ray tube to deflect the cathode-ray beam in two directions mutually at right angles so that as the cylinder is rotated with respect to the earth's magnetic field, the spot on the cathode-ray tube screen follows a circular path. The instantaneous position of the spot on the screen of the tube can be read against a suitable circular scale graduated in terms of the orientation of the cylinder 16 with respect to magnetic north. Thus the orientation of the cylinder with respect to the compass needle, can be ascertained.

When the instrument is fitted in a mobile craft, the cylinder 16 may be fastened to the craft so that the sides of the square formed by the cores 5, 6, 7 and 8 lie in the fore-and-aft and athwartships directions respectively. Thus the magnetic heading of the craft may be read from the cathode-ray tube indicator.

It will be apparent that movement of the spot may well occur due to causes other than change of orientation of cylinder 16; for example, because of a change in the bias conditions in the cathode ray tube.

These difficulties are minimised in the embodiment shown in the drawings by causing the cylinder 16 to rotate continuously about its vertical axis upon the spindles 18 and 19. The spot on the screen of the cathode-ray tube will then trace a circle which will appear continuous if the rate of rotation is adequate.

By comparison with the circular scale on the cathode-ray tube a drift in any direction can be corrected or distortion of the circle due to amplitude variation of either sine or cosine components can be corrected by adjustment of the deflection sensitivity of the cathode-ray tube apparatus in the X direction in the Y direction or in both the X direction and the Y direction.

The magnetic heading of the craft may be obtained from the circular trace on the cathode-ray tube screen by means of a switch 21 connected to an oscillator O3 as shown in Figure 2. The switch 21 is operated by a cam 20 on the spindle 19. The switch 21 is fixed in relation to the fore-and-aft line of the craft and is closed for a short period once each revolution of the cylinder 16. The oscillations from the oscillator O3 are thus transmitted for a short period of time once each revolution of the cylinder 16, to the remote station via a link as illustrated in Figure 3. These oscillations are rectified by the rectifier shown at the remote station in Figure 3 and the rectified output is applied to the control-grid of the cathode-ray tube so as to brighten the circular trace when the switch 21 is closed. Thus a small segment of the circular trace is brightened. Clearly the angular position of the brightened segment of the trace will indicate the heading of the craft in relation to magnetic north.

While the embodiment specifically described utilises a magnetically-sensitive element similar to that disclosed in co-pending British patent application No. 1712/52, the invention is not limited thereto. For example, a compass needle influencing other types of inductor or magnetically-sensitive element, such as that known as "the fluxgate saturable inductor" may be used in further embodiments of the invention.

We claim:

1. A compass comprising a compass needle freely rotatable about an axis, a coil wound about a substantially linear magnetic core and disposed near the compass needle, first magnetic means disposed near the coil for applying a constant biassing magnetic field to the core so that the self-inductance of the core varies in a linear manner with the strength of the component of the magnetic field of the compass needle along the longitudinal axis of the core, and second magnetic means for generating a magnetic field to substantially counteract the action on the compass needle of said first magnetic means without substantially reducing the biassing magnetic field applied to the core.

2. A compass as set forth in claim 1 wherein said first and second magnetic means are bar magnets.

3. A compass as set forth in claim 1 wherein the longitudinal axis of the core is disposed in a plane perpendicular to the axis of rotation of said compass needle, a second coil wound about a second substantially linear core having its longitudinal axis disposed in said plane and arranged perpendicular to the axis of said first core, and means for rotating the coils about the axis of rotation of said compass needle whereby their respective self-inductances vary cyclically in quardature with one aonther.

4. A compass comprising a compass needle, a pivot for supporting the compass needle so that it sets itself in the direction of a magnetic field in which it is placed, four coils arranged on the sides of a square the plane of which is perpendicular to the axis of rotation of the compass needle and disposed to one side of the compass needle, a ferromagnetic core in each of said coils, means adjacent the cores for applying a biassing magnetic field to the cores so that the self-inductance of each core varies in a substantially linear manner with the strength of the component of the magnetic field of the compass needle along the longitudinal axis of the core, means disposed on the other side of the compass needle from said biassing means for generating a magnetic field to substantially counteract the action of said biassing means on the compass needle, and means for continuously rotating the coils at a substantially constant rate about the axis of rotation of the compass needle whereby the self inductances of respective pairs of coils vary cyclically in quadrature with one another.

5. A compass comprising a compass needle, a pivot for supporting the needle so that it sets itself in the direction of a magnetic field in which it is placed, four coils arranged on the sides of a square the plane of which is perpendicular to the axis of rotation of the compass needle and disposed to one side of the compass needle, a ferromagnetic core in each of said coils, a first bar magnet disposed along a diagonal of the square for applying a biassing magnetic field to the cores so that the self-inductance of each core varies in a substantially liner manner with the strength of the component of the magnetic field of the compass needle along the longitudinal axis of the core, means disposed on the other side of the compass needle from said biassing means for generating a magnetic field to substantially counteract the action of said biassing means on the needle, and means for rotating the coils about the axis of rotation of the compass needle.

6. A compass as claimed in claim 5 wherein said means for generating the counteracting magnetic field comprises a second bar magnet having its longitudinal axis parallel to the longitudinal axis of the first bar magnet.

7. A compass as set forth in claim 6 including two oscillators each having a tuned circuit comprising a separate pair of the coils connected in series, each pair of coils consisting of coils disposed on opposite sides of the square, whereby the frequencies of the outputs of the oscillators vary sinusoidally in quadrature with one another as the coils are rotated.

8. A compass as claimed in claim 7 including means for providing, once per revolution of the coils, a signal indicative of the angular relationship of the coils with respect to an object external to the coils, means for demodulating separately the outputs of the two oscillators to provide two voltage outputs which are functions of the respective oscillator frequencies, and means for applying said voltage outputs and said signal to a cathode ray tube indicator to indicate the orientation of the object with respect to the compass needle.

9. A compass as claimed in claim 8 wherein said means for providing a signal indicative of the angular relationship of said coils with respect to said object comprises an oscillator, a switch connected to the output of the oscillator, and a cam arranged to operate the switch and to be driven in synchronism with the coils.

References Cited in the file of this patent

UNITED STATES PATENTS

| | | |
|---|---|---|
| 2,089,987 | Urfer | Aug. 17, 1937 |
| 2,126,910 | Moseley | Aug. 16, 1938 |
| 2,309,117 | John | Jan. 26, 1943 |
| 2,407,536 | Chapman | Sept. 10, 1946 |